(12) United States Patent
Lee et al.

(10) Patent No.: US 8,512,557 B2
(45) Date of Patent: Aug. 20, 2013

(54) RADON REDUCTION APPARATUS

(75) Inventors: Kil Yong Lee, Daejeon (KR); Kyung Seok Ko, Daejeon (KR); Yoon Yeol Yoon, Daejeon (KR)

(73) Assignee: Korea Institute of Geoscience and Mineral Resources(KIGAM) (KR)

( * ) Notice: Subject to any disclaimer, the term of this patent is extended or adjusted under 35 U.S.C. 154(b) by 330 days.

(21) Appl. No.: 12/962,133

(22) Filed: Dec. 7, 2010

(65) Prior Publication Data

US 2011/0219955 A1 Sep. 15, 2011

(30) Foreign Application Priority Data

Mar. 12, 2010 (KR) .......................... 10-2010-0022179

(51) Int. Cl.
*C02F 1/20* (2006.01)
*C02F 1/50* (2006.01)

(52) U.S. Cl.
USPC ............... 210/170.07; 210/188; 210/198.1; 210/218; 210/219; 210/747.7; 210/747.8; 210/750; 210/758; 210/764; 210/767

(58) Field of Classification Search
USPC ............. 95/241, 248, 252, 260, 263, 254; 96/181, 194, 196, 202, 214, 217, 227, 223; 210/750, 767, 787, 758, 749, 764, 188, 198.1, 210/218, 747.7, 170.7, 219; 261/25, 111; 422/256
See application file for complete search history.

(56) References Cited

U.S. PATENT DOCUMENTS

| | | | | |
|---|---|---|---|---|
| 5,385,664 A | * | 1/1995 | Oinuma et al. | 210/151 |
| 6,041,738 A | * | 3/2000 | Hemauer et al. | 119/226 |
| 8,070,944 B2 | * | 12/2011 | Lee et al. | 210/188 |
| 2002/0033542 A1 | * | 3/2002 | McMillan | 261/25 |
| 2006/0033341 A1 | * | 2/2006 | Kaufman | 290/54 |
| 2009/0001017 A1 | * | 1/2009 | Hassan et al. | 210/627 |

FOREIGN PATENT DOCUMENTS

| JP | 2009028702 A | * | 2/2009 |
|---|---|---|---|
| KR | 20-1998-0032613 | | 9/1998 |
| KR | 20-0363205 | | 9/2004 |
| KR | 10-0911416 | | 8/2009 |
| KR | 10-0927438 | | 11/2009 |

OTHER PUBLICATIONS

Korean Office Action—Korean Application No. 10-2010-0022179 issued on Feb. 17, 2012, citing KR 10-0911416, KR 20-1998-0032613, and KR 20-0363205.

* cited by examiner

*Primary Examiner* — Duane Smith
*Assistant Examiner* — Cabrena Hall
(74) *Attorney, Agent, or Firm* — Cantor Colburn LLP

(57) ABSTRACT

Provided is a radon reduction apparatus for groundwater disinfection. The radon reduction apparatus includes an agitation space forming body that groundwater fed through a groundwater feed pipe passes through before inflow into the groundwater storage tank and that forms a water turbine installation space whose top portion is not filled with groundwater; a water turbine located in the water turbine installation space to be rotated by groundwater when the fed groundwater falls, is run against the bottom and scattered; an oxygen supply unit supplying oxygen to groundwater before inflow of the groundwater to the agitation space forming body; a ventilating fan rotated by receiving rotary power of the water turbine and connected to the water turbine installation space to discharge air of the water turbine installation space; and an antiseptic solution supply unit supplying antiseptic solution to be mixed with the groundwater.

5 Claims, 3 Drawing Sheets

RADON REDUCTION APPARATUS

CROSS-REFERENCE TO RELATED APPLICATIONS

This application claims priority under 35 U.S.C. §119 to Korean Patent Application No. 10-2010-0022179, filed on Mar. 12, 2010, in the Korean Intellectual Property Office, the disclosure of which is incorporated herein by reference in its entirety.

TECHNICAL FIELD

The present invention relates to an apparatus for reducing radon contained in pumped groundwater and disinfecting groundwater.

BACKGROUND

Although households that use tap water as drinking water is on a continual rise, places like small farming and fishing villages still use groundwater as drinking water.

But for farming and fishing villages that cannot have in place a water treatment plant due to the fact that a central water supply system like the supply system of the tap water is preferred, large groundwater storage tanks are installed in each village on high elevated areas, which store water pumped up from large tube wells. The groundwater storage tanks provide water to each household in a village.

In addition, a groundwater disinfection device that injects antiseptic solution such as hypochlorous acid water to the pumped up water to disinfect and sterilize it has been invented.

But the conventional groundwater disinfection device simply injects antiseptic solution to the pumped up groundwater in order to disinfect it. Because of this, the antiseptic solution does not get evenly distributed to the groundwater, and as a result its effectiveness is often below expectations. The conventional groundwater disinfection device does not supply oxygen but antiseptic solution.

There are many cases that considerable amount of radon is contained in the pumped up groundwater, often exceeding allowed limits.

Radon is a colorless, odorless, and tasteless inert gas and is one of the decay products of uranium (U-238). Also, Radon is one of radioisotopes with half-life of about 3.8 days. It is known to be one of the harmful substances to the body that emits alpha particles as it decays. Radon is carcinogenic to cause lung cancer when it enters the body through respiratory organs. If Radon enters through digestive organs, it is known to cause gastric cancer.

Therefore, when groundwater containing radon is used as drinking water, there is a high likelihood of gastric cancer being developed, and when it is used as household water, there is a high likelihood of lung cancer being developed by secondary contamination of indoor air. Especially, with regard to the harmful effects of radon to humans, development of lung cancer caused by breathing in radon in a gas state is known to be the greatest. According to data from U.S. EPA, it is the second leading cause of lung cancer, next to smoking.

Looking at regulations of major countries with regard to radon, the U.S. has it set to 4,000 pCi/L (guideline), Finland to 8,100 pCi/L (for drinking water), and Norway to 13,500 pCi/L (guideline). According to published findings of radon content in groundwater in South Korea, about 10% exceed the U.S. guideline, and groundwater of some regions contain radon in quantities that exceed appropriate levels for use as drinking water.

That is, under supervision of the Ministry of Environment since 1998, South Korea has been investigating the degree to which natural radioactive substances are contained in groundwater. According to survey results released in 2008 in which groundwater of water supplies in 523 villages across the country expected to contain a large amount of natural radioactive substances due to geological features were surveyed, 124 places exceeded the drinking water guideline set in the U.S. with regard to radon content. As a result, management with regard to this is planned to be stepped up.

In addition, the Ministry of Environment carried out a pilot operation of radon reduction facilities in village water supplies containing a large amount of radon (over 15,000 pCi/L) in which it confirmed the effects of aeration facilities and active charcoal and the possibility of management in reducing the degree of Radon (source: Ministry of Environment report released in February of 2009). This led to the invention of a radon reduction device by the inventors of KR Patent Application No. 10-2009-0068476.

But the device does not include an infection system for groundwater. Also, it has shortcomings in that it does not meet expectations in terms of reducing radon contained in groundwater and fails to acquire enough power to reduce radon in groundwater.

SUMMARY

An embodiment of the present invention is directed to providing a radon reduction apparatus for groundwater having a disinfection means that shows a superior effect in reducing radon contained in groundwater.

Another embodiment of the present invention is directed to providing enough power to drive the groundwater disinfection means and reduce radon when power is generated by flow force of groundwater.

Still another embodiment of the present invention is directed to providing superior pasteurization and disinfection effects by evenly distributing an antiseptic solution supplied by the groundwater disinfection means to the pumped groundwater.

The radon reduction apparatus of the present invention includes a means for mixing groundwater and an antiseptic solution by supplying the antiseptic solution to the flowing groundwater, i.e., a groundwater disinfection means. Since the groundwater is scattered by being run against a water turbine and oxygen is supplied to the fed groundwater, it is possible to smoothly separate and discharge radon contained in the groundwater from the groundwater. Accordingly, the radon reduction apparatus has superior functions of reducing radon and disinfecting the groundwater.

Also, in realizing a water turbine, which the groundwater is run against, since a plurality of groundwater collection spaces are formed on a circumferential surface and the groundwater collection space is blocked in every direction, a process that falling water gathers and falls again is repeated. Accordingly, it is possible to generate enough power to reduce radon and drive the groundwater disinfection means by flow force of the groundwater.

While a predetermined amount of pumped groundwater goes through an agitation space, the groundwater is delayed before being supplied to the groundwater storage tank and the groundwater and the antiseptic solution are mixed by an agitation screw rotated in the agitation space. Accordingly, the antiseptic solution is evenly distributed in the groundwater and superior pasteurization and disinfection effects are acquired.

The radon reduction apparatus includes an agitation space forming body that groundwater fed through a groundwater feed pipe passes through before inflow into the groundwater storage tank and that forms a water turbine installation space whose top portion is not filled with groundwater.

The radon reduction apparatus includes a water turbine located in the water turbine installation space to be rotated by groundwater when the fed groundwater falls, is run against the bottom and scattered.

The radon reduction apparatus includes an oxygen supply means supplying oxygen to the groundwater before inflow to the agitation space forming body.

The radon reduction apparatus includes a ventilating fan that is rotated by receiving rotary power of the water turbine and that is connected to the water turbine installation space to discharge air of the water turbine installation space.

The radon reduction apparatus includes an antiseptic solution supply means supplying antiseptic solution to be mixed with the groundwater Other features and aspects will be apparent from the following detailed description, the drawings, and the claims.

DETAILED DESCRIPTION OF MAIN ELEMENTS

Figure 1:
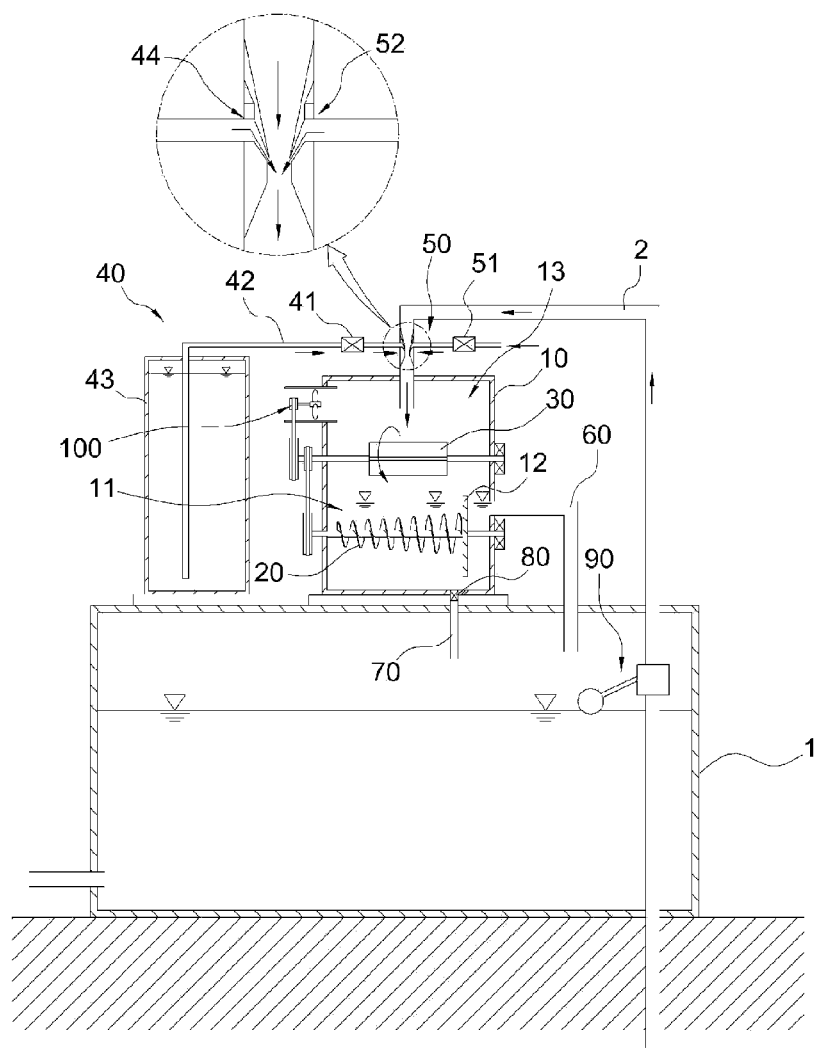
FIG. 1 is a schematic view showing a radon reduction apparatus for groundwater having a disinfection means according to an exemplary embodiment.

| [Detailed Description of Main Elements] | |
| --- | --- |
| 1. | groundwater storage tank |
| 2. | groundwater feed pipe |
| 10. | agitation space forming body |
| 11. | agitation space |
| 12. | partition |
| 13. | water turbine installation space |
| 20. | agitation screw |
| 30. | water turbine |
| 31. | groundwater collection space |
| 32. | slope |
| 40. | antiseptic solution supply means |
| 41. | flow control valve |
| 42. | antiseptic solution feed pipe |
| 43. | antiseptic solution storage tank |
| 44. | orifice |
| 50. | oxygen supply means |
| 51. | oxygen supply control valve |
| 52. | orifice |
| 60. | overflow pipe |
| 70. | drain pipe |
| 80. | displacement control valve |

-continued

| [Detailed Description of Main Elements] | |
| --- | --- |
| 90. | flow rate control apparatus |
| 100. | ventilating fan |

DETAILED DESCRIPTION OF EMBODIMENTS

The technical concept of the present invention will be more specifically described with reference to the accompanying drawings, which is set forth hereinafter. The present invention may, however, be embodied in different forms and should not be construed as limited to the accompanying drawings set forth herein since they are only examples for more specifically describing the technical concept of the present invention.

The present invention relates to a radon reduction apparatus for groundwater, more particularly, to a radon reduction apparatus for groundwater to separate radon, which is contained in the groundwater while the groundwater is run against a water turbine, from the groundwater as described in the earlier application invented by the inventors of the present invention.

Therefore, the radon reduction apparatus for groundwater includes an agitation space forming body 10 that groundwater fed through a groundwater feed pipe 2 goes through before inflow into a groundwater storage tank 1 and that forms a water turbine installation space 13 whose top portion is not filled with groundwater. The radon reduction apparatus also includes a water turbine 30 located in the water turbine installation space 13 to be rotated by groundwater when the fed groundwater falls, is run against the bottom and scattered.

The radon reduction apparatus further includes a ventilating fan 100 that is rotated by receiving rotary power of the water turbine 30 and is connected to the water turbine installation space 13 to discharges air of the water turbine installation space 13. Since the agitation space forming body 10, the water turbine 30 and the ventilating fan 100 have been already published in KR Patent Publication No. 10-2009-0068476, detailed description on their general structures will not be provided herein.

An object of the present invention is to provide a radon reduction apparatus for groundwater that includes a groundwater disinfection means and has superior effect in reducing radon contained in the groundwater. The radon reduction apparatus includes an oxygen supply means 50 for supplying oxygen to the groundwater before inflow of the groundwater into the agitation space forming body 10. Also, the radon reduction apparatus includes an antiseptic solution supply means 40 for supplying antiseptic solution to the groundwater.

That is, the prior art simply separates radon, which is contained in groundwater while the groundwater is scattered by being run against water turbine, from the groundwater and ventilates air containing the separated radon through the ventilating fan 100. In such a structure, the air containing the radon is not smoothly discharged and good separation effect of the radon contained in the groundwater is not shown as much as expected.

The inventors of the present invention figured out through diverse researches and tests that radon shows superior separation efficiency when the groundwater is run against a water turbine after introducing a lot of air into the groundwater containing radon. Therefore, the present invention includes the oxygen supply means 50 for supplying oxygen to the groundwater before inflow into the agitation space forming body 10. Air located in the water turbine installation space 13 may be smoothly discharged through the oxygen supply means 50 without perforation of an individual air inlet in the water turbine installation space 13.

Since the present invention includes the antiseptic solution supply means 40 for supplying the antiseptic solution to the groundwater, radon may be reduced and the groundwater may be disinfected. The groundwater supply means 40 may be realized in diverse known formats. However, since the supplied antiseptic solution is not evenly distributed in the process of supplying the antiseptic solution to the groundwater, the process may not show good pasteurization and disinfection effects.

In order to solve the above problem, a configuration that a predetermined amount of pumped groundwater goes through an agitation space 11 to be delayed before being supplied to the groundwater storage tank 1 and the groundwater and the antiseptic solution are mixed by an agitation screw 20 rotated in the agitation space 11 is invented. To be specific, as shown in the accompanying drawings, the agitation space 11 where a predetermined amount of fed groundwater is delayed before inflow into the groundwater storage tank 1 is formed in a lower portion of the water turbine installation space 13 in the agitation space forming body 10.

In addition, the agitation screw 20 that is located in the agitation space 11 and is rotated by the rotary power received from the water turbine 30 to stir the groundwater and the antiseptic solution inside the agitation space 11 is included. It is for maximizing agitation efficiency through the small agitation screw 20. That is, since large power is required for rotating the agitation screw 20 located in the large-capacity groundwater storage tank 1 and its agitation efficiency is below expectations, the groundwater is supplied to the groundwater storage tank 1 after effectively mixing the antiseptic solution and the groundwater by the small agitation screw 20 in a small space. The agitation screw 20 may be rotated by receiving flow force of the groundwater due to such a structure.

In the present invention, transmitting the rotary power of the water turbine 30 to the agitation screw 20 may be realized by the method using diverse power transmission devices such as a belt, a gear and a chain. Also, a method of rotating the ventilating fan 100 by receiving the rotary power of the water turbine 30 in the ventilating fan 100 may be realized by a method using diverse power transmission devices such as a belt, a gear and a chain. Even if additional power is not used, the agitation screw 20 may be smoothly rotated based on such a configuration.

In the present invention, the antiseptic solution supply means 40 is connected to the groundwater feed pipe 2 for supplying groundwater to the agitation space 11 to supply antiseptic solution to the groundwater going through the groundwater feed pipe 2. In such a case, since the groundwater is scattered by being run against the water turbine 30, agitation efficiency of the antiseptic solution and the groundwater is more improved. In the present invention, when the antiseptic solution fed through the antiseptic solution supply means 40 is a chlorinated antiseptic solution such as hypochlorous acid water, pasteurization and disinfection effects are more improved by the reaction with the supplied oxygen.

The antiseptic solution may be automatically supplied to the groundwater. The antiseptic solution supply means 40 may be configured to introduce the antiseptic solution to the groundwater feed pipe 2 by an orifice 44. That is, the antiseptic solution may be automatically supplied to the groundwater by the flow force of the groundwater flowing in the groundwater feed pipe 2. A flow control valve 41 is required to be installed to control the supply amount of the antiseptic solution. The flow control valve 41 may be installed at an antiseptic solution feed pipe 42. The flow control valve 41 controls the supply amount of the antiseptic solution in consideration of the amount of the fed groundwater and germs contained in the groundwater.

As a constituent element of the present invention, the oxygen supply means 50 may be configured to have air automatically introduced to the groundwater feed pipe 2 by an orifice 52 and include an oxygen supply control valve 51 installed to control the supply amount of oxygen. That is, it may be realized in the same manner as the antiseptic solution supply means 40 having the orifice as described above. The oxygen supply means 50 controls the supply amount of oxygen in consideration of the amount of the fed groundwater and germs contained in the groundwater.

Since the orifice, the flow control valve 41 and the oxygen supply control valve 51 are widely known and used in diverse industrial fields, detailed description will not be provided herein. The flow control valve 41 or the oxygen supply control valve 51 may be configured to make it possible to check a flow rate through a flow gauge.

In the present invention, the groundwater introduced to the agitation space 11 may flow into the groundwater storage tank 1 after being sufficiently stirred with the antiseptic solution in the agitation space 11. When a predetermined amount of groundwater is filled with the agitation space 11, the groundwater overflows to be introduced to the groundwater storage tank 1. That is, as shown in the accompanying drawings, an overflow pipe 60 is connected to the agitation space 11 wherein the groundwater filling up the agitation space 11 overflows due to the overflow pipe 60 to be introduced to the groundwater storage tank 1 by connecting the overflow pipe 60 at a portion separated from the bottom of the agitation space 11.

When an additional means is not included in such a structure, the groundwater may be delayed in the lower portion of the overflow pipe 60 in the agitation space 11. When the groundwater delayed in the agitation space 11, it may cause the contamination of groundwater and freezing trouble. Accordingly, a means for preventing the problem is required.

It is possible to slowly discharge the groundwater, which is not discharged through the overflow pipe 60, to the groundwater storage tank 1 through a drain pipe 70 by connecting the drain pipe 70 to the bottom of the agitation space 11. That is, although the supply of the groundwater is suspended and the groundwater is delayed in the power portion of the overflow pipe 60, the delayed groundwater is slowly drained through the drain pipe 70. Consequently, the groundwater delayed in the agitation space 11 for a long time does not exist.

When groundwater is supplied through the groundwater feed pipe 2, the groundwater is delayed in the agitation space 11 and overflows. Accordingly, an inside cross-sectional area of the drain pipe 70 connected to the bottom of the agitation space 11 may be realized to be smaller than that of the overflow pipe 60 and the groundwater feed pipe 2.

It is also possible to be realized in a form of including a displacement control valve 80 for controlling a flow rate of fluid through the drain pipe 70. That is, displacement is controlled through the drain pipe with no regard to the diameter of the drain pipe 70. In addition, drain is controlled according to a method that drain is performed or not performed through the drain pipe 70.

When a partition 12 is installed in the agitation space 11 so that the groundwater flowing into the agitation space 11 can be discharged in the agitation space 11 after flowing along a predetermined route, the antiseptic solution and the groundwater were sufficiently agitated. That is, the groundwater flowing in the agitation space 11 is discharged after being sufficiently agitated. In such a configuration, the agitation screw 20 may be configured to push groundwater in a flow direction of the groundwater such that the groundwater of the agitation space 11 flows along the predetermined route.

Figure 3:
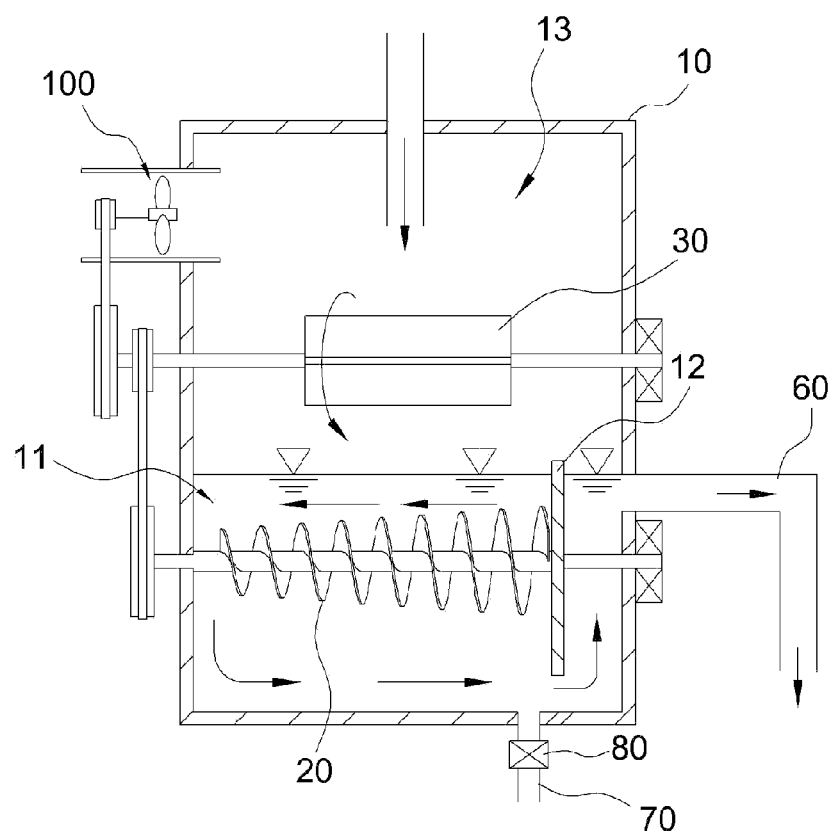
FIG. 3 is a schematic view describing that groundwater flows along a predetermined route by an agitation screw and a partition according to an exemplary embodiment.

In the accompanying drawing, after the groundwater flowing in the agitation space 11 passes through the space formed on the lower portion of the partition 12 and flows to the right side, the groundwater is discharged to the groundwater storage tank through the overflow pipe 60 (see FIG. 3).

Figure 2:
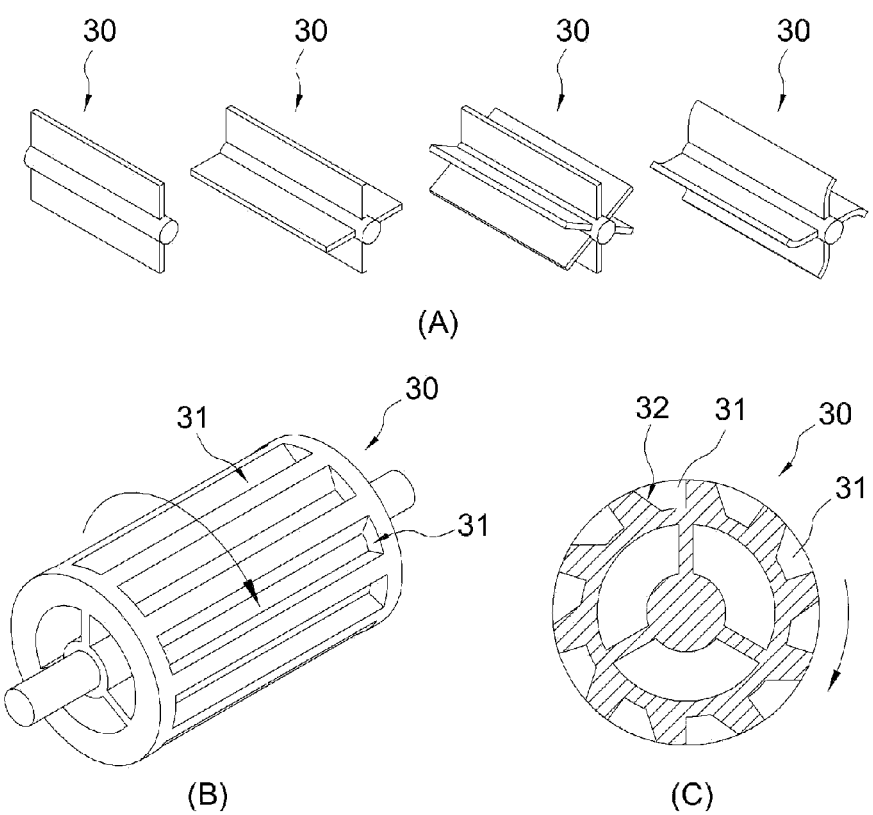
FIG. 2A is a perspective view showing a water turbine having only wings according to an exemplary embodiment.
FIG. 2B is a perspective view showing a water turbine having a groundwater collection space 31 according to an exemplary embodiment.
FIG. 2C is a cross-sectional view showing a water turbine having a groundwater collection space 31 according to an exemplary embodiment.

A water turbine as a constituent element may be realized in diverse forms as shown in FIG. 2. The water turbine may be realized so that enough energy to drive an agitation screw for raising disinfection effect and drive the ventilating fan 100 for reducing radon.

It may be realized in a form of B and C of FIG. 2 that a plurality of groundwater collection spaces 31 are formed on a circumferential surface. Since the groundwater collection space 31 is blocked in every direction, a process that falling water gathers and falls again is repeated. That is, when the falling water gathers and the gathered water falls down by the rotation of the water turbine, power to strongly rotate the water turbine is generated.

Since a rear surface of the groundwater collection space 31 has a slope 32, the area of the groundwater collection space 31 is getting smaller in an up and down direction of the groundwater collection space 31. It makes the smooth rotation of the water turbine by providing power to fall only forward for the gathered groundwater possible.

As shown in the accompanying drawing, a flow rate control apparatus 90 may be included so that the supply of the groundwater through the groundwater feed pipe can be on or off according to the flow rate that the groundwater storage tank is filled with groundwater. The flow rate control apparatus 90 may be included according to a buoyancy using method in a toilet of the bathroom.

When the chlorinated antiseptic solution such as hypochlorous acid water as an antiseptic solution is used, a portion contacting the antiseptic solution may be oxidized quickly. In order to prevent the oxidization, a constituent element contacting the antiseptic solution may be realized with a material having high corrosion resistance such as Teflon or in a form that Teflon having high corrosion resistance is coated. A material having a difficulty in process such as metals including orifice may be realized as a Teflon material. When it costs a lot to realize the entire portion with Teflon, Teflon may be partially coated.

An antiseptic solution storage tank 43 is not shown.

The radon reduction apparatus for groundwater according to the present invention includes a means for mixing groundwater and antiseptic solution by supplying antiseptic solution to the flowing groundwater, i.e., a groundwater disinfection means.

The radon contained in the groundwater is separated while the fed groundwater is scattered by being run against a water turbine. Since an oxygen supply means for supplying oxygen to groundwater is included, the radon contained in the groundwater is more smoothly separated from the groundwater and discharged through a ventilating fan. Accordingly, the radon reduction apparatus has superior functions of reducing radon and disinfecting the groundwater.

Since a plurality of groundwater collection spaces are formed on a circumferential surface and the groundwater collection space is blocked in every direction, a process that falling water gathers and falls again is repeated. Accordingly, it is possible to generate enough power to reduce radon and drive the groundwater disinfection means by flow force of the groundwater.

An agitation space, in which a predetermined amount of fed groundwater is delayed while going through the agitation space before inflow into the groundwater storage tank, is formed on a lower portion of the water turbine installation space in the agitation space forming body. An agitation screw that is located in the agitation space and stirs the groundwater and the antiseptic solution inside the agitation space by being rotated by rotary power transmitted from the water turbine is further included. Accordingly, the antiseptic solution is evenly distributed in the groundwater and superior pasteurization and disinfection effects are acquired.

In a configuration described above, the antiseptic solution flows in the groundwater feed pipe by orifice and a flow control valve installed to control the supply amount of the antiseptic solution is included. Also, air flows in the groundwater feed pipe by orifice and an oxygen supply control valve installed to control the supply amount of oxygen is included. Accordingly, a proper amount of antiseptic solution and oxygen may be automatically supplied correspondingly to the amount of groundwater fed to the groundwater storage tank and the amount of germs contained in the groundwater.

An overflow pipe is connected at a portion spaced apart from a bottom in the agitation space so that the groundwater can overflow to flow in the groundwater storage tank when a predetermined amount of groundwater fills up the agitation space. A drain pipe connected to the bottom of the agitation space is included so that the groundwater of the agitation space flows in the groundwater storage tank. When the inside cross-sectional area is smaller than the inside cross-sectional area of the groundwater feed pipe and the overflow pipe, the antiseptic solution and the groundwater are sufficiently mixed and the groundwater is not delayed in the agitation space for a long time. Accordingly, the contamination of the groundwater and freezing trouble may be prevented.

What is claimed is:

1. A radon reduction apparatus for groundwater having a disinfection means, comprising:
    an agitation space forming body that groundwater fed through a groundwater feed pipe passes through before inflow into a groundwater storage tank and that forms a water turbine installation space whose top portion is not filled with groundwater;
    a water turbine located in the water turbine installation space to be rotated by groundwater when the fed groundwater falls, is run against a bottom and scattered;
    an oxygen supply means supplying oxygen to groundwater before inflow of the groundwater to the agitation space forming body;
    a ventilating fan that is rotated by receiving rotary power of the water turbine and that is connected to the water turbine installation space to discharge air of the water turbine installation space;
    an antiseptic solution supply means supplying antiseptic solution to be mixed with the groundwater, and
    wherein an agitation space, in which a predetermined amount of fed groundwater is delayed while going through the agitation space before inflow into the groundwater storage tank, is formed on a lower portion of the water turbine installation space in the agitation space forming body, and
    an agitation screw located in the agitation space to stir the groundwater and the antiseptic solution inside the agitation space by being rotated by rotary power transmitted from the water turbine is further included, and wherein in the antiseptic solution supply means, the antiseptic solution automatically flows in the groundwater feed pipe by an orifice, and in the oxygen supply means, air automatically flows in the groundwater feed pipe by the orifice, and wherein a partition is installed in the agitation space, thereby the groundwater flowing in the agitation space is discharged in the agitation space after flowing along a predetermined route.

2. The radon reduction apparatus of claim 1, wherein a plurality of groundwater collection spaces are formed on a circumferential surface and a groundwater collection space of the plurality of groundwater collection spaces is blocked in every direction, thereby a process that falling water gathers and falls again is repeated in the water turbine.

3. The radon reduction apparatus of claim 1, wherein the antiseptic solution supply means includes a flow control valve installed to control a supply amount of the antiseptic solution, and the oxygen supply means includes an oxygen supply control valve installed to control a supply amount of oxygen.

4. The radon reduction apparatus of claim 1, wherein an overflow pipe is connected at a portion spaced apart from a bottom in the agitation space and a drain pipe connected to the bottom in the agitation space is included so that a groundwater of the agitation space flows in the groundwater storage tank.

5. The radon reduction apparatus of claim 4, wherein an inside cross-sectional area of the drain pipe is smaller than an inside cross-sectional area of the groundwater feed pipe and the overflow pipe or a displacement control valve for controlling drain through the drain pipe is further included.

* * * * *